US007091689B2

(12) United States Patent
Lee

(10) Patent No.: US 7,091,689 B2
(45) Date of Patent: Aug. 15, 2006

(54) DRIVING CIRCUIT FOR A TWO-PHASE DC BRUSHLESS FAN MOTOR

(75) Inventor: Jian-Xuan Lee, Taipei Hsien (TW)

(73) Assignee: Datech Technology Co., LTD., Taipei Hsien (TW)

( * ) Notice: Subject to any disclaimer, the term of this patent is extended or adjusted under 35 U.S.C. 154(b) by 50 days.

(21) Appl. No.: 10/855,649

(22) Filed: May 28, 2004

(65) Prior Publication Data

US 2005/0264250 A1     Dec. 1, 2005

(51) Int. Cl.
*H02P 7/00* (2006.01)

(52) U.S. Cl. .............. 318/471; 318/268; 318/439; 700/300; 361/33

(58) Field of Classification Search .......... 700/300; 361/33
See application file for complete search history.

(56) References Cited

U.S. PATENT DOCUMENTS

| 5,550,702 | A  | * | 8/1996 | Schmidt et al. ............. 361/103 |
| 5,947,691 | A  | * | 9/1999 | Brown et al. ............. 417/44.1 |
| 6,725,132 | B1 | * | 4/2004 | Frankel et al. ............. 700/300 |
| 6,801,004 | B1 | * | 10/2004 | Frankel et al. ............. 318/268 |
| 6,931,306 | B1 | * | 8/2005 | Frankel et al. ............. 700/300 |
| 6,954,684 | B1 | * | 10/2005 | Frankel et al. ............. 700/300 |
| 6,995,532 | B1 | * | 2/2006 | Frankel et al. ............. 318/268 |
| 2003/0234624 | A1 | * | 12/2003 | Frankel et al. ............. 318/268 |
| 2003/0234625 | A1 | * | 12/2003 | Frankel et al. ............. 318/268 |
| 2005/0242761 | A1 | * | 11/2005 | Fang ............. 318/439 |
| 2005/0243482 | A1 | * | 11/2005 | Lee ............. 361/33 |

OTHER PUBLICATIONS

"LB1868M; Two-Phase Brushless Fan Motor Driver, Monolithic Digital IC." Sanyo Electric Co., Ltd. Semiconductor Company. Tokyo Bld., 1-10, 1 Chrome, Ueno, Taito-ku, Tokyo, 110-8534 Japan. 83100RM(KI) No. 6203; Aug. 2000.*

"THMC50; Remote/Local Temperature Monitor and Fan Controller with SMBus Interface." Texas Instruments Incorporated; Post Office Box 655303; Dallas, Texas; Jul. 1999.*

"LB1860, 1860M, 1861, 1861M; Variable Speed Fan Motor Driver, Monolithic Digital IC." Sanyo Electric Co., Ltd. Semiconductor Company. Tokyo Bld., 1-10, 1 Chrome, Ueno, Taito-ku, Tokyo, 110-8534 Japan. 73096HA(II)/4060TA, TS No. 3519; Jul. 1996.*

(Continued)

*Primary Examiner*—Paul Ip
(74) *Attorney, Agent, or Firm*—Troxell Law Office, PLLC

(57) ABSTRACT

The present invention is a driving circuit for a two-phase DC brushless fan motor comprises a control unit, a Hall element, a motor and a motor protection circuit, an MOS element, a reverse protection circuit and a temperature control circuit. By sensing the running temperature of the motor by the temperature sensor and feeding it back to the motor and offering proper current as tied in with a current limiting resistor, thermal shutdown will not happen.

13 Claims, 4 Drawing Sheets

OTHER PUBLICATIONS

"LB1863M, 1869M; Two-Phase Unipolar Brushless Motor Driver, Automatic Recovery Type . . . " Sanyo Electric Co., Ltd. Semiconductor Company. Tokyo Bld., 1-10, 1 Chrome, Ueno, Taito-ku, Tokyo, 110-8534 Japan. 13097HA (OT) No. 4043; Jan. 1997.*

* cited by examiner

\* CC: Constant Current

DRIVING CIRCUIT FOR A TWO-PHASE DC BRUSHLESS FAN MOTOR

FIELD OF INVENTION

The present invention relates to a control unit for two-phase brushless motor; more particularly, relates to sensing the running temperature of the motor by the temperature sensor and feeding it back to the motor and offering proper current as tied in with a current limiting resistor so that thermal shutdown can be avoided.

DESCRIPTION OF PRIOR ART

As is known about the motor control circuit of the related art (as shown in FIG. 4), the first pin and the second pin of the control unit G are connected with a Hall element A. The sixth pin is connected with the ninth pin by a motor B. The motor B is connected with a diode D. The diode D is connected with a first resistor E and the fourteenth pin. The fourteenth pin is connected with a second resistor F. And the second resistor F is connected with the Hall element A. Accordingly, a motor control circuit is constructed.

Although, the motor control circuit can control the on and off of the motor B, the motor is to form a simple control circuit by a diode, a first resistor and the fourteenth pin of the control unit. When the control unit G receives the overheating signal of the motor B and causes thermal shutdown, the motor B stops running.

BRIEF DESCRIPTION OF INVENTION

The main purpose of the present invention is to have a temperature sensor to sense the temperature and feed it back to the motor as tied in with a current limiting resistor so that an adequate current is offered to avoid thermal shutdown.

To achieve the above purpose, the present invention is a driving circuit for a two-phase DC brushless fan motor, comprising a control unit, such as LB1868M as the preferred embodiment in the present invention which is not intended for any limitation. The control unit of the present invention can be made by way of System on Chip (SOC), Single Chip or Hardware Script Language (HSL).

Therein, the second pin of the control unit is connected with a Hall element. The third pin of the control unit is connected with a fourth capacitor. The fourth pin of the control unit is connected with an eleventh resistor and a third capacitor. The eleventh resistor is connected with a second resistor and the Hall element.

The sixth pin (OUT1) of the control unit is connected with the motor and a seventh resistor. The seventh resistor is connected with a transistor and a second diode. The second diode is connected with a temperature sensor. The emitter of the transistor is connected with the seventh resistor. The collector of the transistor is connected with the temperature sensor by an eighth and a ninth resistor. The base of the transistor is connected with a fifth and a sixth resistor.

The seventh pin (GND) of the control unit is grounded. The ninth pin (OUT2) of the control unit is connected with the motor. A third and a fourth Zener diodes are connected with the two phases of the motor.

The tenth pin of the control unit is connected with a fifth Zener diode. The fifth Zener diode is connected with the motor and an MOS element. The MOS element is connected with the drain of the fifth diode. The gate of the MOS element is connected with the collector of a transistor. The source of the MOS element is connected with a first capacitor and a second diode. The first diode is connected with a security switch.

The eleventh pin (Z2) of the control unit is connected with the twelfth pin. The twelfth pin (FG) of the control unit is connected with the tenth pin. The twelfth pin is connected with a fourth resistor. The fourth resistor is connected with a third resistor. The third resistor is connected with the thirteenth pin of the control unit. The fourth resistor is connected with a switch and a second capacitor.

The fourteenth pin (VIN) of the control unit is connected with a tenth resistor which is a current limiting resistor. The tenth resistor is connected with a first resistor and the second resistor. The first resistor is connected with the source of the MOS element and the fifth resistor.

Accordingly, when the power is on, the control unit is activated and produces half-wave control signals to the motor through the sixth and the ninth pins. By sensing the running temperature of the motor by the temperature sensor and feeding it back to the motor and offering proper current as tied in with a current limiting resistor, thermal shutdown can be avoided.

BRIEF DESCRIPTION OF THE DRAWINGS

The present invention will be better understood from the following detailed description of preferred embodiment of the invention, taken in conjunction with the accompanying drawings, in which.

DESCRIPTION OF PREFERRED EMBODIMENT

The following descriptions of the preferred embodiment are provided to understand the features and the structures of the present invention.

Figure 1:
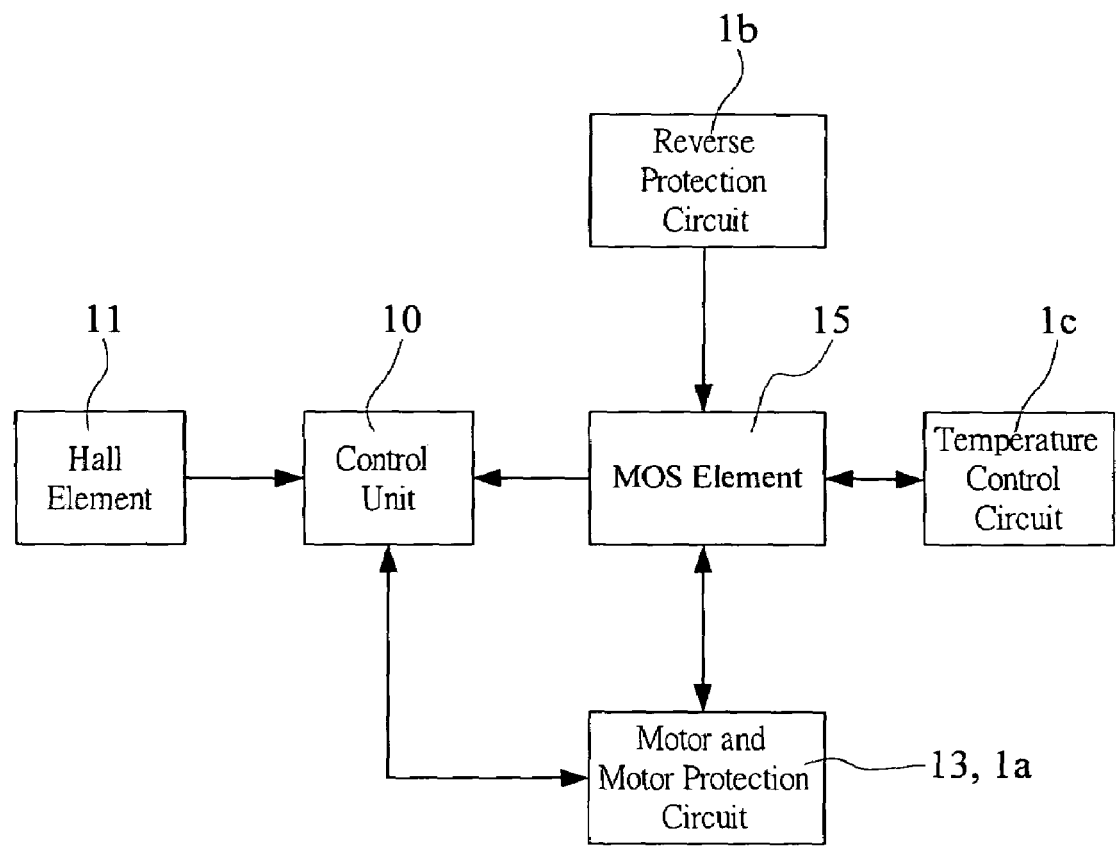
FIG. 1 is a block diagram showing the architecture according to the present invention.
Figure 2:
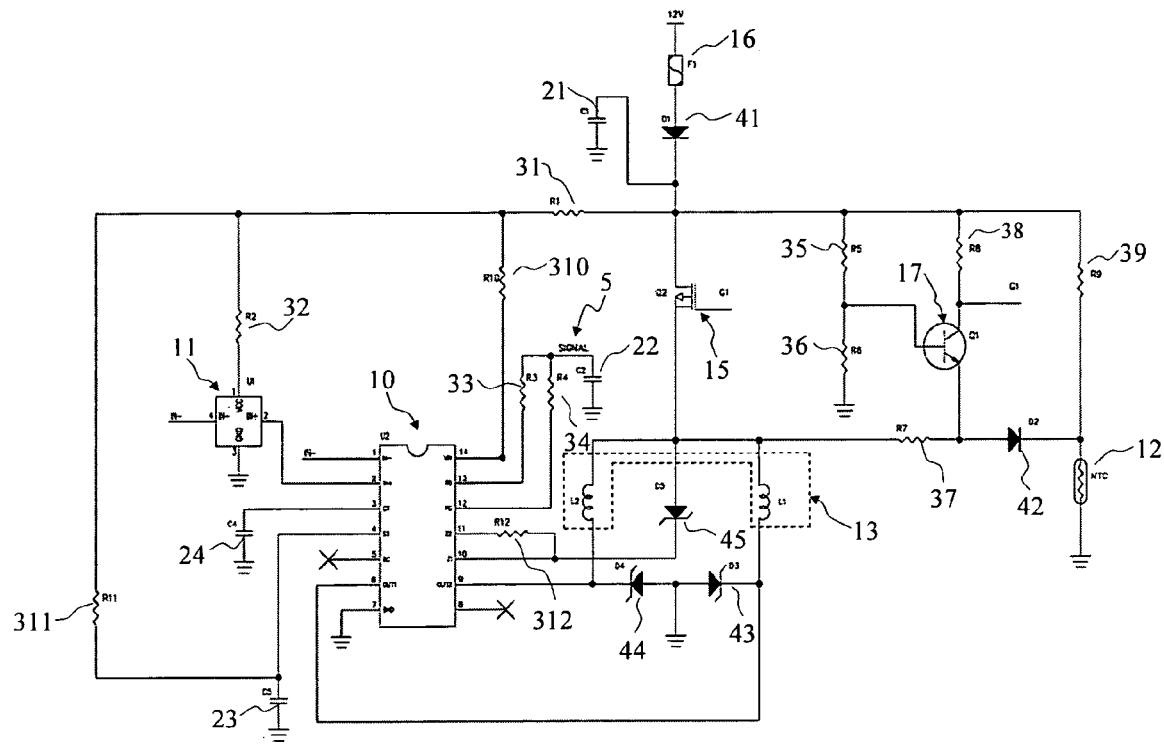
FIG. 2 is a circuit diagram showing the architecture according to the present invention.
Figure 3:
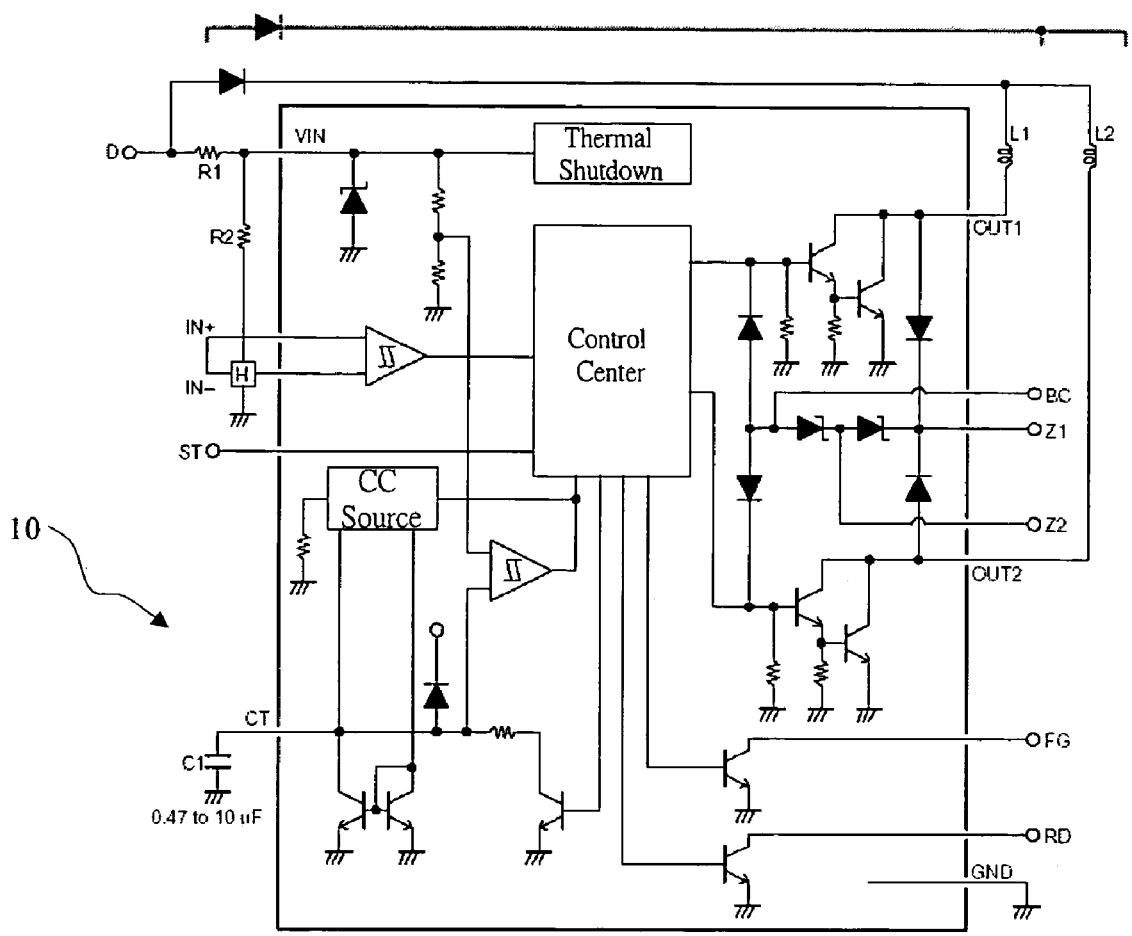
FIG. 3 is a circuit diagram of the control unit according to the present invention.
Figure 4:
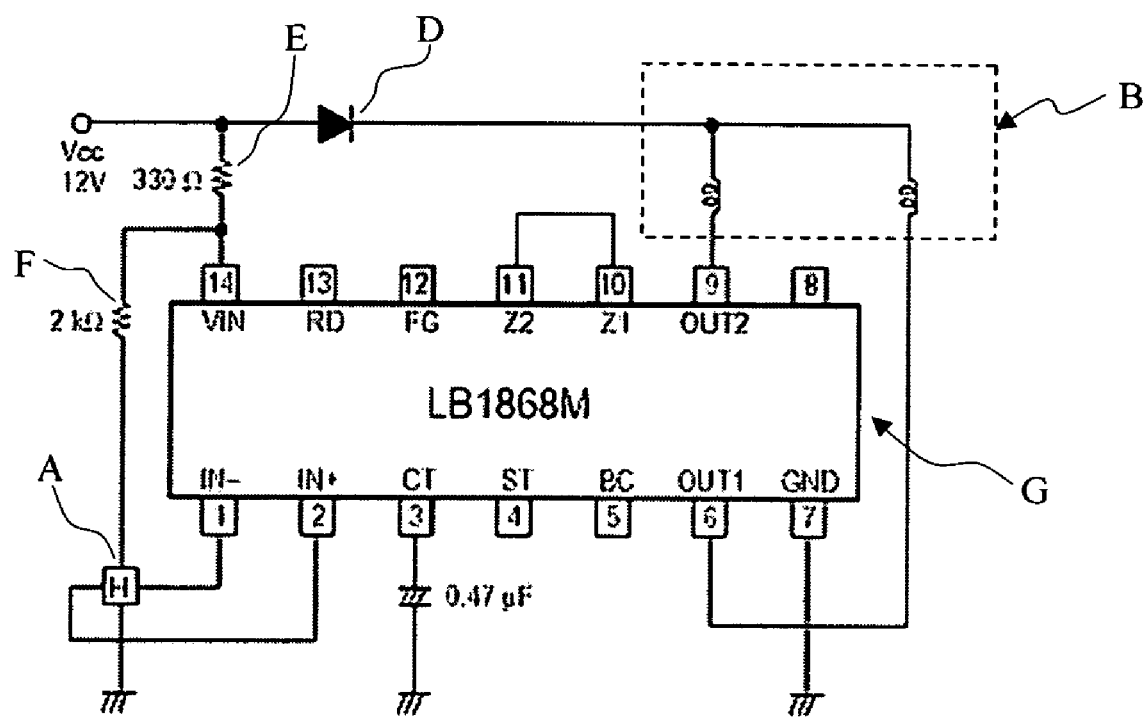
FIG. 4 is a circuit diagram showing the control of a DC brushless fan motor according to the prior art.

Please refer to FIG. 1 till FIG. 3, which are a view of divisions, a control circuit diagram and a circuit diagram of control unit, according to the present invention. As shown in the figures, the present invention is a driving circuit for a two-phase DC brushless fan motor, comprising a control unit 10 connected with a Hall element 11, a motor 13 and a motor protection circuit 1a, an MOS element 15, a reverse protection circuit 1b, a temperature control circuit 1c, a security switch 16, and a transistor 17, as tied in with a plurality of resistors and capacitors, wherein the security switch is of 0.1 ohm resistance to stabilize the current. Thereby, through sensing the running temperature of the motor 13 by a temperature sensor 12 and feeding it back to the motor 13, an adequate current is offered as tied in with a current limiting resistor and so thermal shutdown can be avoided.

The control unit 10 can be an LB1868M chip or a single chip with similar function which is the pivot of the control circuit and comprises a plurality of pins.

Therein, the second pin (IN+) of the control unit 10 is connected with the Hall element 11. The Hall element 11 is to detect the position of the rotor of the motor 13 to acquire the running status. The third pin (CT) of the control unit 10 is connected with a fourth capacitor 24.

The fourth pin (ST) of the control unit 10 is connected with an eleventh resistor 311 and a third capacitor 23. The eleventh resistor 311 is connected with a second resistor and the Hall element 11. The fourth pin is to control the starting and the ending of the operation.

The sixth pin (OUT1) of the control unit 10 is to produce half-wave control signals to control the motor 13 and is connected with the motor 13 and a seventh resistor 37. The seventh resistor 37 is connected with a transistor 17 and a second diode 42. The second diode 42 is connected with a temperature sensor 12. The emitter of the transistor 17 is connected with the seventh resistor 37. The collector of the seventh transistor 17 is connected with the temperature sensor 12 by an eighth and a ninth resistors. The base of the transistor 17 is connected with a fifth and a sixth resistors 38,39. A temperature control circuit 1c is tied in with an MOS element 15 to sense the temperature, and, by comparing voltage difference, to be a switch to speed up the rotation rate of the motor 13 when the temperature gets higher. The voltage is then changed to make the rotation rate of the motor meet the need. In another word, the present invention uses MOS element 15 tied in with the temperature sensor 12 and the temperature control circuit 1c to change the rotation rate of the motor according to different ambient temperature. Because the MOS element 15 is constructed as a P-channel depletion MOSFET and the channel is made by P-type semiconductor and the base is made of n-type semiconductor, the P-channel depletion MOSFET needs a negative value of drain voltage. When the VGS is negative, the operation is in enhancement mode. When the VGS is positive, the operation is in depletion mode. The main carrier of the current in P-channel is the electronic hole. When the VGS equals to zero, the static drain current ID equals to IDSS. When the VGS makes the gate positive, that causes the current ID of the drain increases. When the VGS becomes negative, therefore, the current ID of the drain decreases. By the help of temperature control circuit 1c, the current flown to the motor is under control to change the rotation rate of the motor.

The seventh pin (GND) of the control unit 10 is grounded. The ninth pin (OUT2) of the control unit 10 is to produce half-wave control signals to control the motor 13 and is connected with the motor 13. A third and a fourth diodes 43,44 are connected with the two phases of the motor. The third and fourth diodes 43,44 are Zener diodes. The motor and the motor protection circuit are constructed to prevent the counter-electromotive force (CEMF) of the motor so that voltage is kept on a certain degree by restraining the CEMF and the magnetic noise made by the motor is absorbed also.

The ninth pin (Z1) of the control unit 10 is to feedback the voltage signal and is connected with a fifth Zener diode 45. The fifth Zener diode 45 is connected with the motor 13 and the MOS element 15. The MOS element 15 is a P-channel depletion MOSFET to control the current value and the rotation of the motor 13. The drain of the MOS element 15 is connected with the fifth Zener diode 45. The gate of the MOS element 15 is connected with the collector of the transistor 17. The source of the MOS element 15 is connected with a reverse protection circuit 1b to avoid reverse voltage feedback and, in case of wrongly plugged connector, to keep the voltage of the control unit 10 in an acceptable range so that the control unit 10 will not be damaged. The reverse protection circuit 1b comprises a first capacitor 21 and a first diode 41. The first diode is to absorb the CEMF of the circuit and is connected with a security switch 16.

The eleventh pin (Z2) of the control unit 10 is connected with the twelfth pin 312. The twelfth pin (FG) 312 of the control unit 10 is connected with the tenth pin to monitor the speed and is connected with a fourth resistor 34. The fourth resistor 34 is connected with a third resistor 33. The third resistor 33 is connected with the thirteenth pin (RD) of the control unit 10. The fourth resistor is connected with a switch 5 and a second capacitor 22. The thirteenth pin is to monitor the running status.

The fourteenth pin (VIN) of the control unit 10 is to input the power and is connected with a tenth resistor 310. The tenth resistor 310 is connected with the second resistor 32. A first resistor 31 is connected with the source of the MOS element 15 and the fifth resistor 35. The tenth resistor 310 is a current limiting resistor to avoid over-raised peak current so that thermal shutdown can be avoided from the control unit. Accordingly, a driving circuit for a two-phase DC brushless fan motor is constructed. When the power is on, a signal is transferred to the control unit and the control unit is activated to produce half-wave control signals to control the motor. When the motor runs, the running status of the motor is monitored and adjusted at all times by the Hall element 11 and the temperature sensor 12. The tenth resistor is a current limiting resistor to prevent the control unit from thermal shutdown owing to the overloading of the peak current inputted into the control unit on using. Therefore, by the above circuit components, the motor 13 can be controlled more efficiently. The above circuit components can have further series or parallel connections with some basic circuit components (such as capacitors, resistors, diodes and transistors) to improve actual applications to meet special requests (such as matching).

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A driving circuit for a two-phase DC brushless fan motor, comprising a control unit, a Hall element, a motor, a motor protection circuit, an MOS element, a reverse protection circuit and a temperature control circuit, wherein said Hall element, said motor, said motor protection circuit, said MOS element, said reverse protection circuit and said temperature control circuit are connected with said control circuit;

wherein said control unit comprises a plurality of pins;

wherein said Hall element is to detect the position of the rotor of a motor and to acquire the running status of said motor;

wherein said motor and said motor protection circuit prevent the counter-electromotive force (CEMF) of said motor and the magnetic noise made by said motor is absorbed;

wherein said MOS element is to control current value to achieve required rotation rate;

wherein said reverse protection circuit is to prevent said control unit from damage and to keep the voltage of said control unit in an acceptable range in case of reverse voltage feedback or wrongly plugged connector; and wherein said temperature control circuit is tied in with said MOS element to sense the temperature; by comparing the voltage burdens, to act as a switch that, when the temperature is getting higher, rotation rate is speeded up; and to change the current to make the rotation rate meet the requirement.

2. The driving circuit for a two-phase DC brushless fan motor according to claim 1, wherein said control unit is a LB1868M chip or a single chip function like LB1868M.

3. The driving circuit for a two-phase DC brushless fan motor according to claim 2, further comprising four capacitors, wherein the third pin of said control unit is connected with a fourth capacitor.

4. The driving circuit for a two-phase DC brushless fan motor according to claim 2, further comprising eleven resistors and three capacitors, wherein the fourth pin of said control unit is connected with an eleventh resistor and a third capacitor; and said eleventh resistor is connected with a second resistor and said Hall element.

5. The driving circuit for a two-phase DC brushless fan motor according to claim 2, wherein the seventh pin of said control unit is grounded.

6. The driving circuit for a two-phase DC brushless fan motor according to claim 2, further comprising five Zener diodes, wherein the tenth pin of said control unit is connected with a fifth Zener diode; said fifth Zener diode is connected with said MOS element; said MOS element is connected with the drain of said fifth diode; and, the gate of said MOS element is connected with the collector of a transistor.

7. The driving circuit for a two-phase DC brushless fan motor according to claim 2, further comprising twelve resistors, wherein the eleventh pin of said control unit is connected with a twelfth resistor; and said twelfth resistor is connected with the tenth pin of said control unit.

8. The driving circuit for a two-phase DC brushless fan motor according to claim 2, further comprising four resistors and two capacitors, wherein the twelfth pin of said control unit is connected with a fourth resistor; said fourth resistor is connected with a third resistor; said third resistor is connected with the thirteenth pin; and said fourth resistor is connected with a switch and a second capacitor.

9. The driving circuit for a two-phase DC brushless fan motor according to claim 2, further comprising ten resistors, wherein the fourteenth pin of said control unit is connected with a tenth resistor; said tenth resistor is connected with a first resistor and a second resistor; and said first resistor is connected with said fifth resistor by said MOS element.

10. The driving circuit for a two-phase DC brushless fan motor according to claim 2, wherein said Hall element is connected with the second pin of said control unit.

11. The driving circuit for a two-phase DC brushless fan motor according to claim 2, further comprising four Zener diodes, wherein said motor and said motor protection circuit are characterized in that the ninth pin of said control unit is connected with a motor and said motor is connected with a third and a fourth Zener diodes.

12. The driving circuit for a two-phase DC brushless fan motor according to claim 2, wherein the source of said MOS element is connected with said reverse protection circuit and said reverse protection circuit comprises a first capacitor, a first diode and a security switch which is connected with said first diode.

13. The driving circuit for a two-phase DC brushless fan motor according to claim 2, further comprising nine resistors and two diodes, wherein said temperature control circuit is characterized in that the sixth pin of said control unit is connected with said motor and a seventh resistor; said seventh resistor is connected with a transistor and a second diode; said second diode is connected with a temperature sensor; the emitter of said transistor is connected with said seventh resistor; the collector of said transistor is connected with the eighth and the ninth resistors and said temperature sensor; and the base of said transistor is connected with a fifth and a sixth resistors.

* * * * *